(12) United States Patent
Darling et al.

(10) Patent No.: US 9,966,618 B2
(45) Date of Patent: May 8, 2018

(54) FLOW BATTERY WITH VOLTAGE-LIMITING DEVICE

(71) Applicant: United Technologies Corporation, Hartford, CT (US)

(72) Inventors: Robert Mason Darling, South Windsor, CT (US); Michael L. Perry, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 47 days.

(21) Appl. No.: 14/650,126

(22) PCT Filed: Dec. 9, 2012

(86) PCT No.: PCT/US2012/068650
§ 371 (c)(1),
(2) Date: Jun. 5, 2015

(87) PCT Pub. No.: WO2014/088601
PCT Pub. Date: Jun. 12, 2014

(65) Prior Publication Data
US 2015/0318567 A1    Nov. 5, 2015

(51) Int. Cl.
*H01M 8/04* (2016.01)
*H01M 8/04858* (2016.01)
(Continued)

(52) U.S. Cl.
CPC ....... *H01M 8/04873* (2013.01); *H01M 8/043* (2016.02); *H01M 8/04223* (2013.01);
(Continued)

(58) Field of Classification Search
CPC ..... H01M 8/04873; H01M 8/188; H01M 8/20
See application file for complete search history.

(56) References Cited

U.S. PATENT DOCUMENTS 5,318,865 A    6/1994    Kaneko et al.
5,648,184 A    7/1997    Inoue et al.
(Continued)

FOREIGN PATENT DOCUMENTS

CN    102354761    2/2012
JP    S54-19228    7/1979
(Continued)

OTHER PUBLICATIONS

European Search Report for European Patent Application No. 12889729 completed Jun. 13, 2016.
(Continued)

*Primary Examiner* — Miriam Stagg
*Assistant Examiner* — Brent C Thomas
(74) *Attorney, Agent, or Firm* — Carlson, Gaskey & Olds, P.C.

(57) ABSTRACT

A flow battery includes at least one cell that has a first electrode, a second electrode spaced apart from the first electrode and an electrolyte separator layer that is arranged between the first electrode and the second electrode. A storage portion is fluidly connected with the at least one cell. At least one liquid electrolyte includes an electrochemically active specie and is selectively deliverable to the at least one cell. An electric circuit is coupled with the first electrode and the second electrode. The circuit includes a voltage-limiting device that is configured to limit a voltage potential across the first electrode and the second electrode in response to a transition of the at least one cell from an inactive, shut-down mode with respect to an active, charge/discharge mode.

21 Claims, 2 Drawing Sheets

(51) Int. Cl.
*H01M 8/18* (2006.01)
*H01M 8/04223* (2016.01)
*H01M 8/043* (2016.01)
*H01M 8/20* (2006.01)
*H01M 8/04746* (2016.01)

(52) U.S. Cl.
CPC ....... *H01M 8/04953* (2016.02); *H01M 8/188* (2013.01); *H01M 8/04753* (2013.01); *H01M 8/20* (2013.01); *Y02E 60/528* (2013.01)

(56) References Cited

U.S. PATENT DOCUMENTS

| | | | |
|---|---|---|---|
| 6,476,583 B2* | 11/2002 | McAndrews | H02J 7/0013 320/119 |
| 6,522,919 B1 | 2/2003 | Flower et al. | |
| 6,628,085 B2 | 9/2003 | Yang | |
| 7,250,229 B2 | 7/2007 | Yang et al. | |
| 7,410,712 B2 | 8/2008 | Reiser et al. | |
| 7,527,886 B2 | 5/2009 | Fuller et al. | |
| 7,790,303 B2 | 9/2010 | Fredette | |
| 7,855,020 B1 | 12/2010 | Margiott et al. | |
| 7,955,746 B2 | 6/2011 | Fredette | |
| 8,062,801 B2 | 11/2011 | Moran et al. | |
| 8,142,950 B2 | 3/2012 | Reiser et al. | |
| 9,166,243 B2 | 10/2015 | Perry | |
| 2002/0014880 A1 | 2/2002 | McAndrews | |
| 2002/0192513 A1* | 12/2002 | Colbow | H01M 8/04223 429/431 |
| 2004/0070370 A1* | 4/2004 | Emura | H02J 9/062 320/128 |
| 2004/0224192 A1* | 11/2004 | Pearson | H01M 8/04223 429/431 |
| 2005/0074649 A1* | 4/2005 | Skiba | H01M 8/04037 429/429 |
| 2008/0274393 A1 | 11/2008 | Markoski et al. | |
| 2008/0292938 A1 | 11/2008 | Perry et al. | |
| 2009/0136789 A1 | 5/2009 | Pien et al. | |
| 2010/0092813 A1 | 4/2010 | Sahu | |
| 2010/0178533 A1 | 7/2010 | Whitehead et al. | |
| 2011/0045332 A1* | 2/2011 | Horne | B60L 11/1824 429/105 |
| 2011/0117975 A1 | 5/2011 | Dunn et al. | |
| 2012/0030886 A1 | 2/2012 | Persson et al. | |
| 2012/0203392 A1 | 8/2012 | Pandy et al. | |
| 2012/0306452 A1 | 12/2012 | Christensen et al. | |
| 2012/0308856 A1* | 12/2012 | Horne | H01M 8/04201 429/72 |
| 2012/0326672 A1* | 12/2012 | Dennis | H02J 1/10 320/134 |
| 2013/0084506 A1* | 4/2013 | Chang | H01M 8/188 429/400 |
| 2013/0157087 A1* | 6/2013 | Pandy | H01M 8/188 429/51 |

FOREIGN PATENT DOCUMENTS

| | | |
|---|---|---|
| JP | H02-148659 | 6/1990 |
| JP | 10040944 | 2/1998 |
| JP | 2006-156029 | 6/2006 |
| JP | 2006313691 | 11/2006 |
| JP | 2008166164 | 7/2008 |
| JP | 2012164530 | 8/2012 |

OTHER PUBLICATIONS

International Preliminary Report on Patentability for PCT Application No. PCT/US2012/068650, dated Jun. 18, 2015.
The International Search Report and Written Opinion for PCT Application No. PCT/US2012/068650, dated Feb. 8, 2013.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.

(56) References Cited

OTHER PUBLICATIONS

Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.

\* cited by examiner

FLOW BATTERY WITH VOLTAGE-LIMITING DEVICE

BACKGROUND

This disclosure relates to flow batteries for selectively storing and discharging electric energy.

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative liquid electrolyte is delivered to the negative electrode and a positive liquid electrolyte is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, liquid electrolyte solutions that include reactants that participate in reversible electrochemical reactions.

SUMMARY

Disclosed is a flow battery that includes at least one cell that has a first electrode, a second electrode spaced apart from the first electrode and an electrolyte separator layer that is arranged between the first electrode and the second electrode. A storage portion is fluidly connected with the at least one cell. At least one liquid electrolyte includes an electrochemically active specie and is selectively deliverable to the at least one cell. An electric circuit is coupled with the first electrode and the second electrode. The circuit includes a voltage-limiting device that is configured to limit a voltage potential across the first electrode and the second electrode in response to a transition of the at least one cell from an inactive, shut-down mode with respect to an active, charge/discharge mode.

Also disclosed is a method of controlling corrosion in a flow battery. The method includes transitioning a flow battery to or from an inactive, shut-down mode with respect to an active, charge/discharge mode. The flow battery includes at least one cell having a first electrode, a second electrode spaced apart from the first electrode, and an electrolyte separator layer arranged between the first electrode and the second electrode. A voltage potential across the first electrode and the second electrode of the flow battery is limited during the transitioning using a voltage-limiting device arranged in an electric circuit that is electrically coupled with the first electrode and the second electrode

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
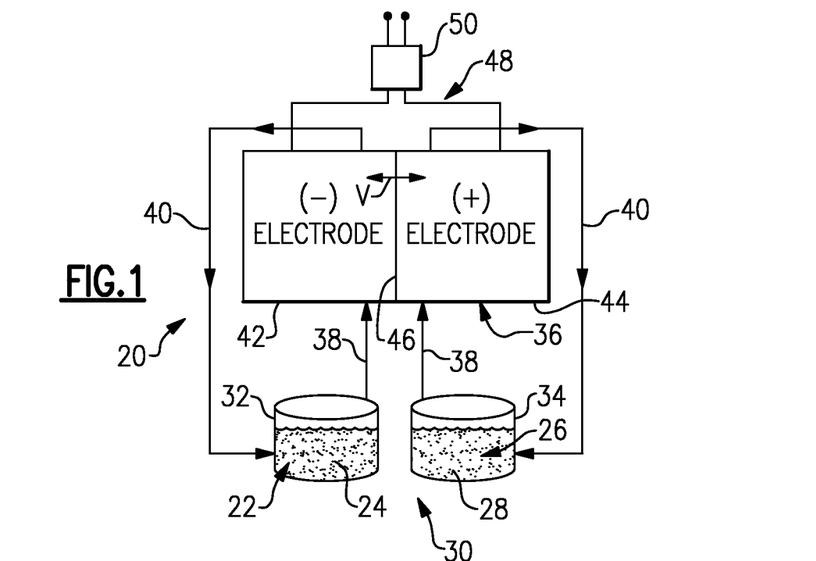
FIG. 1 shows an example flow battery having a voltage-limiting device.

FIG. 1 schematically shows portions of an example flow battery 20 for selectively storing and discharging electrical energy. As an example, the flow battery 20 may be used to convert electrical energy generated in a renewable energy system to chemical energy that is stored until a later time when there is greater demand at which the flow battery 20 then converts the chemical energy back into electrical energy. The flow battery 20 can supply the electric energy to an electric grid, for example. As will be described, the disclosed flow battery 20 includes features for enhanced corrosion protection.

The flow battery 20 includes a liquid electrolyte 22 that has an electrochemically active specie 24 that functions in a redox pair with regard to an additional liquid electrolyte 26 and electrochemically active specie 28. For example, the electrochemically active species 24 and 28 are based on vanadium, bromine, iron, chromium, zinc, cerium, lead or combinations thereof. In embodiments, the liquid electrolytes 22 and 26 are aqueous solutions that include one or more of the electrochemically active species 24 and 28. Alternatively, a single one of the liquid electrolytes 22 or 26 can be used in combination with a gaseous reactant. In this regard, the flow battery 20 has at least one liquid electrolyte (22 or 26) that has an electrochemically active specie (24 or 28).

The liquid electrolytes 22 (e.g., an anolyte) and 26 (e.g., a catholyte) are contained in a storage portion 30 that includes respective storage tanks 32 and 34. As shown, the storage tanks 32 and 34 are substantially equivalent cylindrical storage tanks; however, the storage tanks 32 and 34 can alternatively have other shapes and sizes.

The liquid electrolytes 22 and 26 are delivered (e.g., pumped) to one or more cells 36 of the flow battery 20 through respective feed lines 38 and are returned from the cell or cells 36 to the storage tanks 32 and 34 via return lines 40. The cell 36 includes a first electrode 42, a second electrode 44 spaced apart from the first electrode 42, and an electrolyte separator layer 46 arranged between the first electrode 42 and the second electrode 44. In general, the cell or cells 36 can include bipolar plates, manifolds and the like for delivering the liquid electrolytes 22 and 26 through flow field channels to the electrodes 42 and 44. However, it is to be understood that other configurations can be used. For example, the cell or cells 36 can alternatively be configured for flow-through operation where the liquid electrolytes 22 and 26 are pumped directly into the electrodes 42 and 44 without the use of flow field channels.

The electrolyte separator layer 46 can be an ionic-exchange membrane, or a micro-porous polymer membrane, or an electrically insulating microporous matrix of a material like SiC that prevents the liquid electrolytes 22 and 26 from rapidly mixing but permits selected ions to pass through to complete the redox reactions while electrically isolating the two electrodes 42 and 44. Multiple cells 36 can be provided in a stack.

The liquid electrolytes 22 and 26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42 and 44. The electric circuit 48 includes a voltage-limiting device 50. As will be described, the voltage limiting-device 50 is configured to limit a voltage potential V across the electrodes 42 and 44 upon transition of the cell or cells 36 to or from an inactive, shut-down mode with respect to an active, charge/discharge mode.

The flow battery 20 has several modes of use, including the inactive, shut-down mode. The modes are represented by different physical states of the flow battery 20. For example, the flow battery 20 has an active, charge/discharge mode in which the liquid electrolytes 22 and 26 are continuously circulated from the storage tanks 32 and 34 through the cell or cells 36 and back into the storage tanks 32 and 34. In the charge/discharge mode, the flow battery is either being charged with electrical energy from the electric circuit 48 or is discharging electrical energy to the electric circuit 48. Additionally, the cell or cells 36 are substantially or completely filled with the liquid electrolytes 22 and 26. For example, during the charge/discharge mode, the porous volume of the cell or cells are ideally 100% filled with the liquid electrolytes 22 and 26 and, at a minimum, are 90% filled with the liquid electrolytes 22 and 26.

The flow battery 20 is transitioned from the charge/discharge mode into an inactive, shut-down mode when not in use for charging or discharging, or vice versa for start-up. There can be numerous different procedures for shut-down of the flow-battery 20, depending upon which of numerous inactive, shut-down modes is selected. In one example, the liquid electrolytes 22 and 26 are static in the inactive, shut-down mode, at least with regard to active pumping, such that the liquid electrolytes 22 and 26 do not flow through the cell or cells 36 and are primarily held in the respective storage tanks 32 and 34.

In a further example, the cell or cells 36 are at least partially drained of the liquid electrolytes 22 and 26 in the shut-down mode such that the cell or cells 36 are partially or fully empty. For example, the cell or cells 36 are more than 90% empty with regard to liquid electrolytes 22 and 26 in the porous volume of the cell or cells 36. In this case, the porous volumes of the cell or cells 36 are mostly filled with gases from the head-space of the storage tanks displaced by the liquid volume drained from the cells. Air may also infiltrate the system and enter the cells when the cells are drained of liquid.

In a further example, the cell or cells 36 are at least partially drained of the liquid electrolytes 22 and 26 in the shut-down mode, as described above, and the empty volume is provided with a chemically and electrochemically inert cover gas. For example, the cover gas includes nitrogen, argon, helium or combinations thereof. In a further example, the cover gas has a purity of 90% or greater of the given gas or gases. The cover gas serves to blanket the cell or cells 36 in a relatively chemically inert environment to facilitate the prevention of air or oxygen entering into the cell or cells 36 and protect against oxidation corrosion or self-discharge reactions with the electrochemically active species.

In a further example, the cell or cells 36 are partially or fully filled with the liquid electrolytes 22 and 26 in the shut-down mode and permitted to self-discharge to a discharged state. The discharged liquid electrolytes 22 and 26 are held, without active pumping circulation, in the cell or cells 36 during the period of the inactive, shut-down mode. The discharged liquid electrolytes 22 and 26 serve to blanket the cell or cells 36 to limit exposure to air or oxygen that may infiltrate the flow battery 20.

If in the inactive, shut-down mode, the flow battery 20 must be started to bring it out of the inactive, shut-down mode and into the active, charge/discharge mode. Conversely, if in the charge/discharge mode, the flow battery 20 must be stopped or shut-down to bring it into the inactive, shut-down mode. For example, the start-up period begins with the initiation of circulation of the liquid electrolytes 22 and 26 from the storage tanks 32 and 34 and ends once the liquid electrolytes 22 and 26 substantially or completely fill the cell or cells 36 as described above in the active charge/discharge mode. The shut-down period begins with the stopping of circulation of the liquid electrolytes 22 and 26 from the storage tanks 32 and 34 and ends once the start-up period is initiated.

The flow battery 20 is susceptible to corrosion during these transition periods of starting-up or shutting-down, which can debit the performance and useful life of the flow battery 20. The type and degree of corrosion can depend on which of the inactive, shut-down modes are used. For example, in the inactive, shut-down mode with the cell or cells 36 at least partially empty, the free volume of the cell or cells 36 can contain air and moisture that has infiltrated the flow battery 20. A minor amount of hydrogen may also be present from spontaneous self-discharging of the liquid electrolytes 22 and 26 during the inactive, shut-down mode. Upon start-up, the liquid electrolytes 22 and 26 are fed into the cell or cells 36. As the liquid electrolytes 22 and 26 fill the feed inlet of cell or cells 36, they generate a cell voltage, as is the case during normal operation. However, this cell voltage is also present at the exits of the cells, since the cell components are good electrical conductors, yet the liquid electrolytes 22 and 26 have not yet reached the cell exits during the start-up period, and air/oxygen and water are present at the exits. If the cell voltage exceeds a threshold, the electric potential generated in the electrodes 42 and 44 can drive undesired corrosion reactions between the oxygen, water, and/or hydrogen and the materials of the cell or cells 36, such as to convert carbon of carbon-based components to carbon dioxide. In one example, the threshold in the flow battery 20 is 1.5 volts per cell for driving carbon corrosion reactions.

Somewhat similarly, in the inactive, shut-down modes that have the discharged liquid electrolytes 22 and 26 held in the cell or cells 36 or that use the cover gas, the electric potential at the exit of the cell or cells 36 can exceed a threshold that drives undesired corrosion reactions. The threshold, and thus the severity of the corrosion reactions, can vary depending upon the selected inactive, shut-down mode and the length of the shut-down period. Similar phenomenon can occur upon shutting down from the charge/discharge mode into the shut-down mode.

To control or limit the electric potentials generated in the electrodes 42 and 44 during the transition period, the flow battery 20 includes the voltage-limiting device 50. The voltage-limiting device 50 facilitates the reduction in the cell voltages during transition and thereby reduces the undesired corrosion reactions that can occur. For instance, the voltage-limiting device 50 can be a resistor, a rheostat, a controllable resistor such as a gate transistor, a plurality of resistors that are electrically connected in parallel or series or even an external load, such as a traditional rechargeable battery.

The voltage-limiting device 50 has an electric impedance that is selected to correspond to the voltage generated by the particular flow battery 20 during the transition period. For example, the selected electric impedance limits the cell or stack voltage but does not draw so much current as to generate a starvation condition of the cell or cells 36 with regard to the amount of liquid electrolytes 22 and 26 available for reaction. That is, a non-zero voltage potential below the threshold for driving corrosion reactions is desired.

In a further example, an instantaneous desired amount of electric impedance through the transition period as the liquid electrolytes 22 and 26 fill the cell or cells 36 changes. Thus, the electric impedance of the voltage-limiting device 50 can be varied through the transition period to maintain or control the electric potential with regard to an identified threshold. For example, for a start-up period, the voltage-limiting device 50 can initially provide a relatively low electric impedance that is then increased through the start-up period as the liquid electrolytes 22 and 26 fill the cell or cells 36. The inverse may be used for a shut-down.

Figure 2:
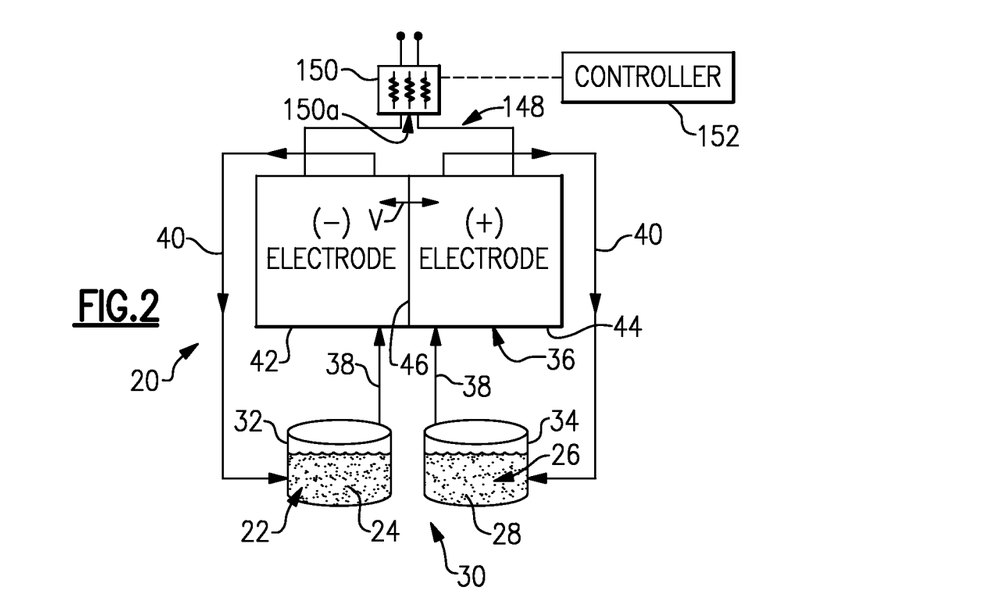
FIG. 2 shows another example flow battery having a voltage-limiting device with a plurality of resistors.

FIG. 2 illustrates selected portions of another example flow battery 120. In this disclosure, like reference numerals designate like elements where appropriate and reference numerals with the addition of one-hundred or multiples thereof designate modified elements that are understood to incorporate the same features and benefits of the corresponding elements. In this example, an electric circuit 148 of the flow battery 120 includes a voltage-limiting device 150 that has a plurality of resistors 150a. The resistors 150a can be connected in series or in parallel.

The voltage-limiting device 150 is in communication with a controller 152. The controller 152 may also be connected with other components of the flow battery 120, such as pumps, valves, gas sources, etc., to control the operation thereof. The controller 152 can include software, hardware or both and is operable to control operation of the voltage-limiting device 150 with respect to the resistors 150a. Given this description, one of ordinary skill in the art will be able to provide appropriate hardware and/or programming to operate the controller 152 as described herein. In one example, the controller 152 can individually control each of the resistors 150a between an ON (resistance) and OFF (no resistance) state to vary the overall electric impedance of the voltage-limiting device 150 through the transition period.

Figure 3:
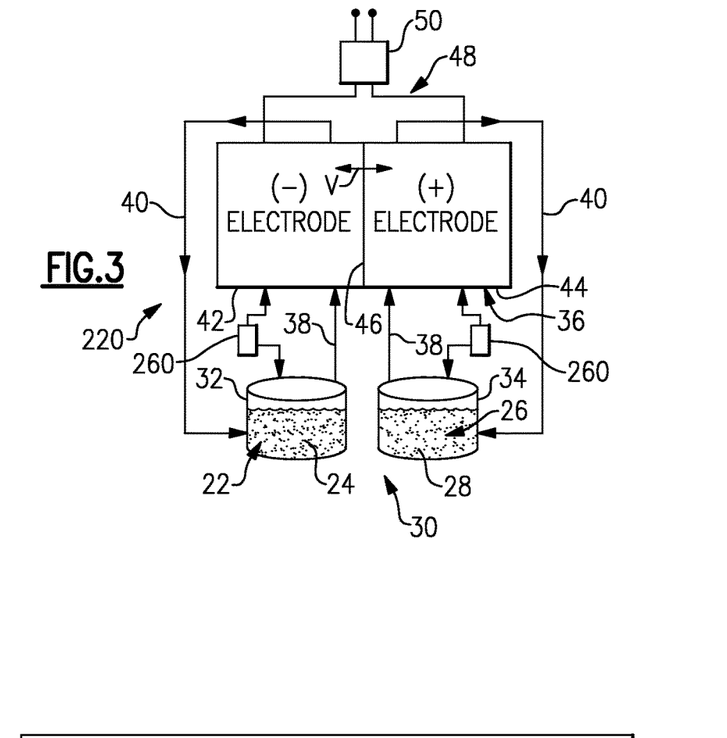
FIG. 3 shows another example of a flow battery having a voltage-limiting device and gas sources to provide a cover gas.

FIG. 3 illustrates selected portions of another example flow battery 220 that is somewhat similar to the flow battery 20 depicted in FIG. 1 but also includes gas sources 260. The gas sources 260 can be fluidly connected with the respective storage tanks 32 and 34 and the respective electrodes 42 and 44. The gas sources include one or more of the cover gases described above and serve to provide the cover gas to a header volume of the storage tanks 32 and 34 and to the cell or cells 36. Alternatively, a single gas source can be used to provide the cover gas to a header volume of the storage tanks 32 and 34 by fluidly connecting the gas reservoirs at the top of the storage tanks 32 and 34. This single gas source can also be used to provide the cover gas to both electrodes of the cell or cells 36.

Figure 4:
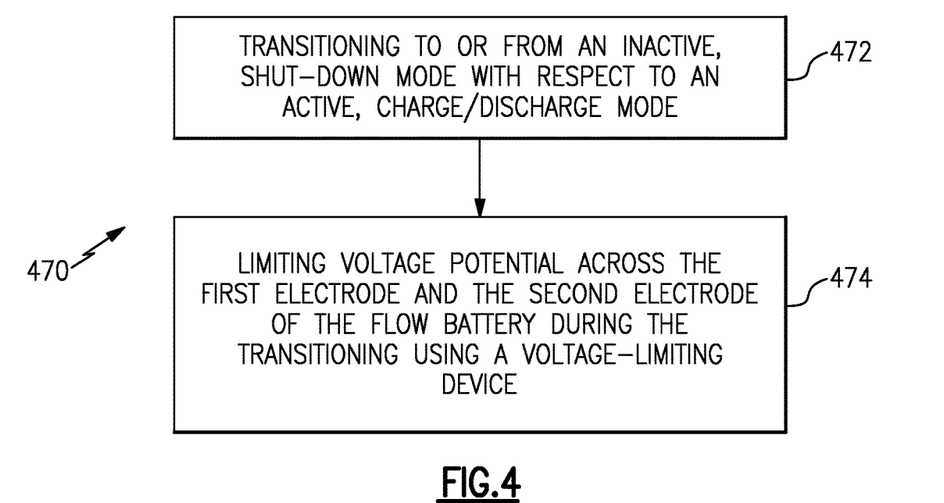
FIG. 4 shows an example method of controlling corrosion in a flow battery.

FIG. 4 shows an example method 470 of controlling a voltage potential in a flow battery during a mode transition to control corrosion, such as in any of the flow batteries 20, 120 and 220 described herein. That is, the flow batteries 20, 120 and 220 embody the method 470 and vice versa. The method 470 includes step 472 of transitioning the flow battery to or from the inactive, shut-down mode with respect to the active, charge/discharge mode and step 474 of limiting a voltage potential across a first electrode and a second electrode of the flow battery during and in response to the transitioning by using a voltage-limiting device arranged in an electric circuit that is electrically coupled with the first electrode and the second electrode. The method 470 can further include any or all of the operational actions described herein with regard to the flow batteries 20, 120 and 220.

In one further example related to start-up from the inactive, shut-down mode to the active, charge/discharge mode, the voltage-limiting device 50/150 is optionally disengaged in response to the start-up period ending. That is, the voltage-limiting device 50/150 ceases to provide any impedance.

In one further example related to start-up from the inactive, shut-down mode to the active, charge/discharge mode, the method 470 includes limiting or controlling the voltage potential across the electrodes by controlling the active flow of the liquid electrolytes 22 and 26. For example, the start-up includes feeding the liquid electrolytes 22 and 26 into the cell or cells 36 such that the liquid electrolytes 22 and 26 are fed one at a time. Feeding the liquid electrolytes 22 and 26 one at a time can lower the cell voltages generated by the inlet region of the cell or cells 36 and thus reduces or avoids driving any corrosion reactions. In one example, the anolyte 22 is introduced first, followed by the catholyte 24, after the anolyte is exiting the cells.

In one further example related to stopping from the active, charge/discharge mode inactive into the inactive, shut-down mode, the method 470 includes limiting or controlling the voltage potential across the electrodes by stopping (i.e. no active pumping) the flow of the liquid electrolytes 22 and 26 into the cell or cells 36 one at a time. For example, the catholyte 24 flow is stopped first, followed by the anolyte 22, after the cell voltages have decreased below the cell voltage threshold.

In a further example related to stopping from the active, charge/discharge mode into the inactive, shut-down mode, the voltage limiting device can be utilized to lower the cell voltages more rapidly after flow of one or both of the electrolytes are stopped. As an example, the after the catholyte 24 flow is stopped the voltage limiting device can be used to bring the average cell voltage down to desired shut-down voltage (e.g., less than 0.2 V per cell) and then the anolyte 22 is stopped. In this manner, the cells are shut down in a known state; namely, to an electrochemical potential that is close to the anolyte potential, which is significantly lower than the catholyte potential and will thereby minimize undesired oxidation reactions that can occur during the shut-down period.

In a further example related to stopping from the active, charge/discharge mode inactive into the inactive, shut-down mode, the method 470 can include filling the electrodes 42 and 44 with the cover gas, as described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
at least one cell including a first electrode, a second electrode spaced apart from the first electrode, and an electrolyte separator layer arranged between the first electrode and the second electrode;
a storage portion fluidly connected with the at least one cell;
at least one liquid electrolyte including an electrochemically active specie, the at least one liquid electrolyte being selectively deliverable to the at least one cell;
an electric circuit electrically coupled with the first electrode and the second electrode and capable of transmitting electrical energy to and from the at least one cell during an active, charge/discharge mode, the electric circuit including a voltage-limiting device configured to limit a voltage potential across the first electrode and the second electrode in response to a transition of the at least one cell to or from the inactive, shut-down mode with respect to an active, charge/discharge mode, wherein the voltage-limiting device has a plurality of resistors; and
a controller in communication with the voltage-limiting device, the controller being configured to individually control operation of each of the resistors between ON/OFF conditions to control an amount of electric impedance, and wherein the controller is configured to increase the impedance during transition of the at least one cell from the inactive, shut-down mode to the active, charge/discharge mode and decrease impedance during transition from the active, charge/discharge mode to the inactive, shut-down mode.

2. The flow battery as recited in claim 1, wherein, in the inactive, shut-down mode, there is no active flow of the at least one liquid electrolyte from the storage portion to the at least one cell.

3. The flow battery as recited in claim 2, wherein, in the inactive, shut-down mode, the at least one cell is at least partially empty of the at least one liquid electrolyte.

4. The flow battery as recited in claim 2, wherein, in the inactive, shut-down mode, the at least one cell includes a cover gas selected from the group consisting of air, nitrogen, argon, helium, hydrogen and combinations thereof.

5. The flow battery as recited in claim 2, wherein, in the inactive, shut-down mode, the at least one cell includes the at least one liquid electrolyte in a discharged state.

6. A method of controlling a voltage potential in a flow battery during a mode transition to control corrosion, the method comprising:
(a) transitioning a flow battery to or from an inactive, shut-down mode with respect to an active, charge/discharge mode, the flow battery including at least one cell having a first electrode, a second electrode spaced apart from the first electrode, and an electrolyte separator layer arranged between the first electrode and the second electrode; and
(b) limiting a voltage potential across the first electrode and the second electrode of the flow battery during step (a) using a voltage-limiting device arranged in an electric circuit that is electrically coupled with the first electrode and the second electrode, the electric circuit capable of transmitting electrical energy to and from the at least one cell during the active, charge/discharge mode, wherein the voltage-limiting device has a plurality of resistors, and the limiting of the voltage potential includes individually controlling operation of each of the resistors between ON/OFF conditions to control an amount of electric impedance by increasing impedance during transition from the inactive, shut-down mode to the active, charge/discharge mode and decreasing the impedance during transition from the active, charge/discharge mode to the inactive, shut-down mode.

7. The method as recited in claim 6, including limiting the voltage potential across the first electrode and the second electrode to be below a predefined threshold voltage potential.

8. The method as recited in claim 6, wherein, in the inactive, shut-down mode, there is no active flow of at least one liquid electrolyte of the flow battery from a storage portion of the flow battery to the at least one cell.

9. The method as recited in claim 8, wherein the transitioning includes starting the flow battery from the inactive, shut-down mode to the active, charge/discharge mode, and during the starting of the flow battery, the at least one cell of the flow battery is partially empty of at least one liquid electrolyte.

10. The method as recited in claim 8, wherein the transitioning includes starting the flow battery from the inactive, shut-down mode to the active, charge/discharge mode, and during the starting of the flow battery, the at least one cell includes a cover gas therein that is select from the group consisting of air, nitrogen, argon, helium, hydrogen and combinations thereof.

11. The method as recited in claim 6, wherein the transitioning includes starting the flow battery from the inactive, shut-down mode to the active, charge/discharge mode, and during the starting of the flow battery, feeding a positive liquid electrolyte and a negative liquid electrolyte to, respectively, the first electrode and the second electrode such that the positive liquid electrolyte and the negative liquid electrolyte are fed one at a time.

12. The method as recited in claim 6, wherein the transitioning includes starting the flow battery from the inactive, shut-down mode to the active, charge/discharge mode, and disengaging the voltage-limiting device such that the voltage-limiting device ceases to limit the voltage potential across the first electrode and the second electrode.

13. The method as recited in claim 6, wherein the transitioning includes stopping the flow battery from the active, charge/discharge mode into the inactive, shut-down mode, and during the stopping, stopping active flow of a positive liquid electrolyte and a negative liquid electrolyte through, respectively, the first electrode and the second electrode such that active flow of the positive liquid electrolyte and the negative liquid electrolyte are stopped one at a time.

14. The method as recited in claim 13, further including limiting the voltage potential across the first electrode and the second electrode of the flow battery after stopping flow of one of the positive liquid electrolyte and the negative liquid electrolyte and before stopping flow of the other of the negative liquid electrolyte and the positive liquid electrolyte.

15. The method as recited in claim 6, wherein the transitioning includes stopping the flow battery from the active, charge/discharge mode into the inactive, shut-down mode, and filling the first electrode and the second electrode with a cover gas selected from the group consisting of air, nitrogen, argon, helium, hydrogen and combinations thereof.

16. The flow battery as recited in claim 1, wherein the voltage-limiting device includes a rheostat.

17. The flow battery as recited in claim 1, wherein the voltage-limiting device includes a rechargeable battery.

18. The flow battery as recited in claim 1, wherein the resistors are gate transistors.

19. The flow battery as recited in claim 1, wherein the at least one liquid electrolyte includes two liquid electrolytes, and the controller is configured to feed the two liquid electrolytes into the at least one cell one at a time during the transition.

20. The flow battery as recited in claim 1, wherein the at least one liquid electrolyte includes two liquid electrolytes, and the controller is configured to stop feeding of the two liquid electrolytes into the at least one cell one at a time during the transition.

21. The flow battery as recited in claim 1, wherein the transition includes a state in which the at least one cell is partially empty with respect to the at least one liquid electrolyte and there is oxygen at an exit of the at least one cell.

* * * * *

UNITED STATES PATENT AND TRADEMARK OFFICE
CERTIFICATE OF CORRECTION

PATENT NO. : 9,966,618 B2
APPLICATION NO. : 14/650126
DATED : May 8, 2018
INVENTOR(S) : Robert Maxon Darling and Michael L. Perry Page 1 of 1

It is certified that error appears in the above-identified patent and that said Letters Patent is hereby corrected as shown below:

In the Claims

In Claim 1, Column 7, Line 23; replace "the inactive" with --an inactive--

In Claim 1, Column 7, Line 24; replace "to an active" with --to the active--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*